United States Patent
McDole et al.

(10) Patent No.: US 11,856,129 B2
(45) Date of Patent: *Dec. 26, 2023

(54) SYSTEMS AND METHODS TO MANAGE MODELS FOR CALL DATA

(71) Applicant: Capital One Services, LLC, McLean, VA (US)

(72) Inventors: Sara McDole, Midlothian, VA (US); Premkumar Dhayalan, Richmond, VA (US); Thomas Zahorik, Charlottesville, VA (US); Saiteja Kamuni, Richmond, VA (US); Sri Penmatsa, Richmond, VA (US); Vamsi Rallabandi, Richmond, VA (US); Danni Tang, Richmond, VA (US); Suresh Pothireddy, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,556

(22) Filed: Jun. 1, 2022

(65) Prior Publication Data

US 2022/0294897 A1    Sep. 15, 2022

Related U.S. Application Data

(63) Continuation of application No. 16/879,933, filed on May 21, 2020, now Pat. No. 11,381,677, which is a
(Continued)

(51) Int. Cl.
*H04M 3/22* (2006.01)
*G06Q 20/30* (2012.01)
*H04M 3/51* (2006.01)

(52) U.S. Cl.
CPC ........ *H04M 3/2218* (2013.01); *G06Q 20/305* (2013.01); *H04M 3/5175* (2013.01); *H04M 3/5183* (2013.01)

(58) Field of Classification Search
None
See application file for complete search history.

(56) References Cited

U.S. PATENT DOCUMENTS

| | | | | |
|---|---|---|---|---|
| 5,526,407 | A | * 6/1996 | Russell | ..... G06F 3/16 715/201 |
| 6,724,887 | B1 | 4/2004 | Eilbacher et al. | |

(Continued)

FOREIGN PATENT DOCUMENTS

CN    102055853 A    5/2011

*Primary Examiner* — Quynh H Nguyen
(74) *Attorney, Agent, or Firm* — Perkins Coie LLP

(57) ABSTRACT

Systems and methods for managing models for call data are disclosed. For example, the system may include one or more memory units storing instructions and one or more processors configured to execute the instructions to perform operations. The operations may include receiving, from a user device, an input indicating a segment of a first recorded call and an attribute associated with the segment. The operations may include determining a parameter of a model, wherein the model is associated with the attribute. The operations may include changing the parameter based on the input. The operations may include generating an updated model based on the changed parameter, wherein the updated model may be configured to analyze recorded calls having one or more segments with the same attribute.

20 Claims, 7 Drawing Sheets

Related U.S. Application Data continuation of application No. 16/693,673, filed on Nov. 25, 2019, now Pat. No. 10,694,024.

(56) References Cited

U.S. PATENT DOCUMENTS

| | | |
|---|---|---|
| 8,396,741 B2 | 3/2013 | Kannan et al. |
| 10,362,121 B1 | 7/2019 | Crausaz |
| 10,484,532 B1 * | 11/2019 | Newman ............... H04W 12/12 |
| 2012/0130771 A1 | 5/2012 | Kannan et al. |
| 2015/0003595 A1 | 1/2015 | Yaghi et al. |

* cited by examiner

| Agent First Name | Agent Last Name | Account ID | | Call From Date |
|---|---|---|---|---|
| Frederick | | | | mm/dd/yyyy |

| Contact ID | Agent EID | Origin Phone | Duration From (sec) | Duration To (sec) | Call To Date |
|---|---|---|---|---|---|
| | | | Min: 0 | Max: 86400 | mm/dd/yyyy |

Search  Reset

| Agent First Name | Agent Last Name | Account ID | Call Date | Contact ID | Origin Phone | Agent EID | Duration |
|---|---|---|---|---|---|---|---|
| Frederick | Jones | 123456789 | Jun 27, 2019 18:00:57 EST | 0abc1422357 | +4049035768 | frj213 | 11:12 |
| ... | ... | ... | ... | ... | ... | ... | ... |

SYSTEMS AND METHODS TO MANAGE MODELS FOR CALL DATA

CROSS-REFERENCE TO RELATED APPLICATIONS

This application is a continuation of U.S. patent application Ser. No. 16/879,933, filed on May 21, 2020, which issued as U.S. Pat. No. 11,381,677 on Jul. 5, 2022, which is a continuation of U.S. patent application Ser. No. 16/693,673, filed on Nov. 25, 2019, which issued as U.S. Pat. No. 10,694,024 on Jun. 23, 2020. The disclosures of the above-mentioned applications are expressly incorporated herein by reference in their entireties.

TECHNICAL FIELD

Example disclosed embodiments generally relate to systems and methods for managing models related to call data.

BACKGROUND

Thousands of calls take place every day between customers and merchants, creating a massive amount of data to manage. Analyzing call data, such as recorded calls between a merchant and a customer, is necessary for merchants to monitor customer relationships and ensure that correct actions are taken related to customer accounts.

Historically, merchants have relied on sampling recorded calls. This process can be limited and/or time-consuming. Traditional processes also lack user-friendly means for identifying and demarcating attributes of calls between merchants and customers.

Conventional systems often have poor performance, and/or are inadequately designed to handle large amounts of data. Such systems are ill-equipped to handle the challenges of the growing complexity of call data analysis.

The disclosed system and methods may address one or more of the problems set forth above and/or other problems in the prior art.

SUMMARY

Consistent with the present embodiments, there is provided an example system for managing call data. The system may include one or more memory units storing instructions and one or more processors configured to execute the instructions to perform operations. The operations may include receiving, from a user device, an input indicating a segment of a recorded call and an attribute associated with the segment. The operations may include determining a parameter of a model, wherein the model is associated with the attribute. The operations may include changing the parameter based on the input. The operations may include generating an updated model based on the changed parameter, wherein the updated model may be configured to analyze recorded calls having one or more segments with the same attribute.

Consistent with the present embodiments, an example method for managing call data is disclosed. The method may include receiving an input indicating a segment of a recorded call and an attribute associated with the segment, wherein the recorded call comprises a waveform of an audio recording and the input is based on an input received at a graphical user interface. The method may include determining a parameter of a model, wherein the model is associated with the attribute. The method may include changing the parameter based on the input. The method may include generating an updated model based on the changed parameter, wherein the updated model may be configured to analyze recorded calls having one or more segments with the same attribute.

Consistent with the present embodiments, another example method for managing call data is disclosed. The method may include receiving an input indicating a segment of a recorded call and an attribute associated with the segment. The method may include determining a parameter of a model, wherein the model is associated with the attribute. The method may include changing the parameter based on the input. The method may include generating an updated model based on the changed parameter, wherein the updated model is configured to identify, among a plurality of recorded calls, a second recorded call having one or more segments with the same attribute.

Consistent with other disclosed embodiments, example embodiments of non-transitory computer readable storage media may store program instructions, which may be executed by at least one processor device and perform any of the methods described herein.

The foregoing general description and the following detailed description provide example embodiments and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 is an illustration of a graphical user interface for an electronic tagged call database consistent with one or more example embodiments.

FIG. 4A is an illustration of a graphical user interface for interacting with electronic call data consistent with one or more example embodiments.

DETAILED DESCRIPTION

The disclosure is generally directed to automated systems and processes for coordinating analysis of call data to efficiently configure models (e.g., machine learning models) associated with different performance criteria for calls (e.g. telephone conversations between a customer and a merchant). In some embodiments, call data may be displayed at a graphical user interface and an electronic tag for the call data may be received. In some embodiments, the electronically tagged call data may be stored in a searchable database. In some embodiments, a model may receive electronically tagged call data and may be configured based on the received call data and a test criterion.

Reference will now be made in detail to example embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
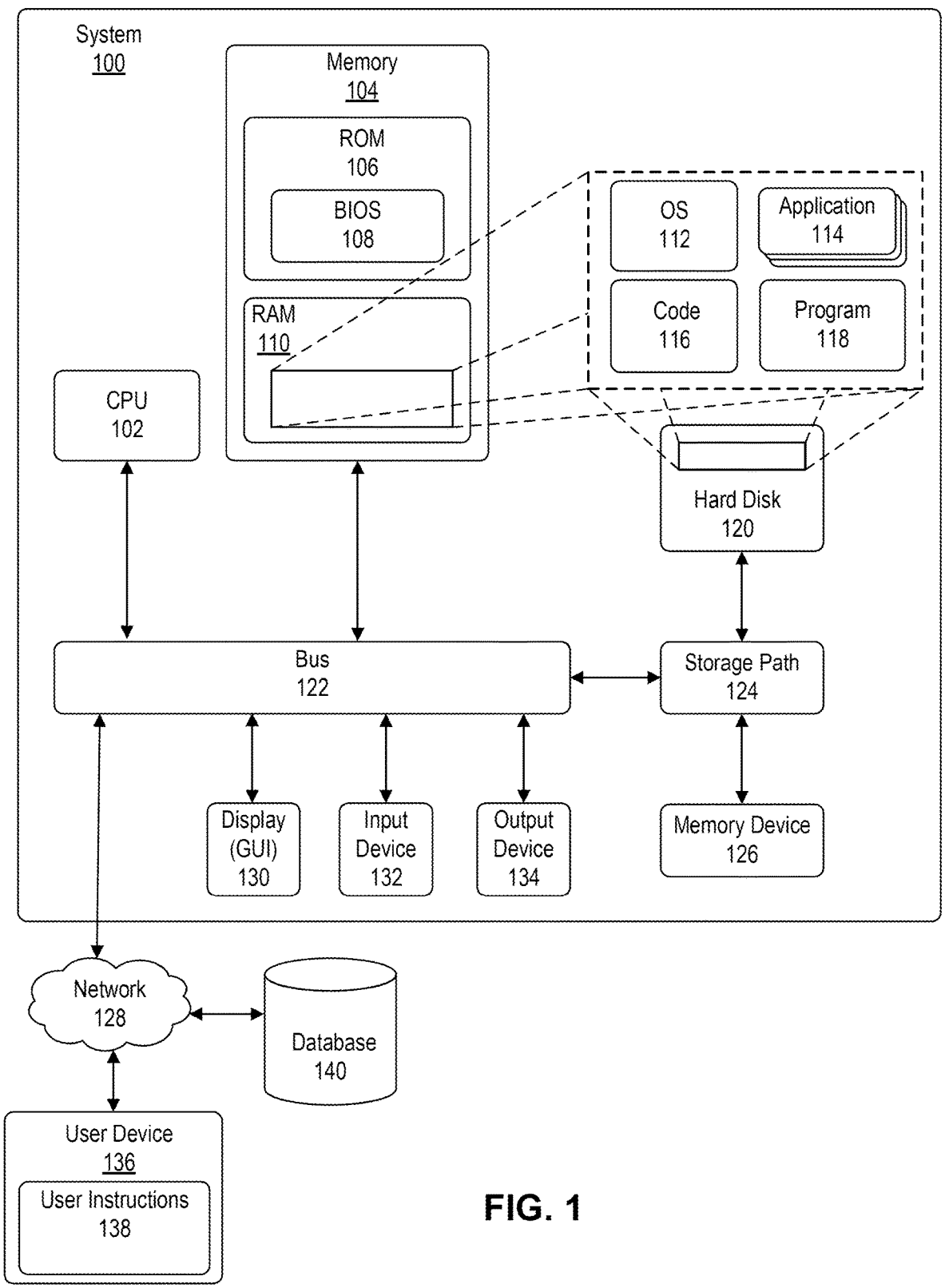
FIG. 1 is a diagram of an example system consistent with one or more example embodiments.

FIG. 1 is a block diagram of an example system 100 consistent with one or more example embodiments. In some aspects, system 100 may reflect a computing system for receiving, transmitting, and processing data and/or models. Components of system 100 may include a central processing unit (CPU) or processor 102, a memory unit 104, and a bus 122 that interconnects system components including memory 104 and CPU 102. Bus 122 may be any of several types of bus structures including a memory bus or memory controller, a peripheral bus, and a local bus using any of a variety of bus architectures. By way of example, and without limitation, such architectures include Industry Standard Architecture (ISA) bus, Micro Channel Architecture (MCA) bus. Enhanced ISA (EISA) bus, Video Electronics Standards Association (VESA) local bus, and Peripheral Component Interconnect (PCI) bus also known as Mezzanine bus.

System 100 may include a variety of computer-readable media. Computer-readable media may be any available media that may be accessed by system 100 and may include both volatile and nonvolatile media. For example, computer-readable media may include volatile and nonvolatile computer storage media implemented in any method or technology for storage of information such as computer-readable instructions, data structures, program modules or other data. Computer storage media may include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by system 100.

Memory 104 may include computer-readable media in the form of volatile and/or nonvolatile memory such as read only memory (ROM) 106 and random access memory (RAM) 110. A basic input/output system (BIOS) 108 containing the basic routines that help to transfer information between elements within system 100, may be typically stored in ROM 106. Additionally, RAM 110 may contain operating system (OS) 112, applications 114, other programmable code 116, and program 118. RAM 110 may contain data and/or program modules that are immediately accessible to and/or presently being operated on by CPU 102, including a delay time associated with data, such as feedback data. In addition to RAM 110, hard disk 120 and/or memory device 126 may also contain data and/or program modules to carry out the embodiments described herein.

System 100 may also include other removable/nonremovable, volatile/nonvolatile computer media. By way of example, FIG. 1 illustrates a hard disk 120 that may read from or write to nonremovable, nonvolatile magnetic media, and a memory device 126 that may be an optical disk drive or a magnetic disk drive that may read from or write to a removable, a nonvolatile storage medium such as an optical disk or magnetic disk. Other removable/nonremovable, volatile/nonvolatile computer storage media that may be used in exemplary system 100 include, but are not limited to, magnetic tape cassettes, flash memory cards, digital versatile disks, digital video tape, solid state RAM, and solid state ROM. Hard disk drive 120 and memory device 126 may be connected to bus 122 through a storage path 124.

The disks and their associated computer media, discussed above and illustrated in FIG. 1, may provide storage of computer-readable instructions, programmable code, data structures, program modules and other data for system 100. In FIG. 1, hard disk 120 is illustrated as storing an operating system (OS) 112, one or more applications 114, other programmable code 116, and a program 118. A user may enter commands and information into system 100 through an input device 132 such as a keyboard, mouse, trackball, touch pad tablet, touchscreen display, electronic digitizer, or microphone. Other input devices may include a joystick, game pad, satellite dish, and scanner. These and other input devices may be connected to CPU 102 through an input interface that may be coupled to bus 122, but may be connected by other interface and bus structures, such as a parallel port, game port or a universal serial bus (USB), A display (GUI) 130 or other type of video device may also be connected to bus 122 via an interface, such as a video interface. Display 130 may comprise any suitable display for presenting user interfaces, windows, graphical content, text content, and/or information consistent with the disclosed embodiments. In some embodiments, display 130 may include, for example, a CRT display, LCD display, LED display, touchscreen display (e.g.; using any suitable sensing technology such as resistive, capacitive, infrared, etc.), projected display, etc. In addition, an output device 134, such as speakers or a printer, may be connected to bus 122 through an output interface.

System 100 may operate in a networked environment using a network 128 a user device 136, and a database 140. Multiple instances (not shown) of system 100 may exist, such that a system 100 may connect to other systems 100 using network 128. System 100 may also include a personal computer (e.g., a laptop, desktop, etc.), a server, a router, a network PC, a peer device, a mobile device, or other common network node. User device 136 may include a computer, tablet, smartphone, or PDA, etc. In some aspects, user device 136 may comprise any or all of the components of system 100. Database 140 may store data for use by user device 136 or system 100.

Network 128 depicted in FIG. 1 may include a wired or wireless local area network (LAN), a wide area network (WAN), cellular network (e.g., a CDMA or GSM network), RF network, Near Field Communication (NFC) network, WiFi network, Metropolitan Area Network (MAN), NFC communication link(s), any physical wired connection (e.g., via an I/O port), a Personal Area Network (PAN) (e.g., a Bluetooth™ network), or other type of network. Consistent with the disclosed embodiments, network 128 may include any accessible network or networks interconnected via one or more communication protocols, including hypertext transfer protocol (HTTP) and transmission control protocol/internet protocol (TCP/IP). Communications protocols consistent with the disclosed embodiments may also include protocols facilitating data transfer using radio frequency identification (RFID) communications and/or NFC. Moreover, network 128 may also include one or more mobile device networks, such as a GSM network or a PCS network, allowing system 100 and/or user device 136 to send and receive data via applicable communications protocols. Such networking environments are commonplace in offices, enterprise-wide computer networks, intranets, and the Internet. In a networked environment, programmable code and application programs may be stored in remote computers. By way of example; FIG. 1 illustrates mobile instructions 138 as residing on user device 136. It will be appreciated that the network connections shown are exemplary and other means of establishing communication between computers and user device 136 may be used.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of client devices, interfaces, model optimizers, model storages, and databases. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Figure 2:
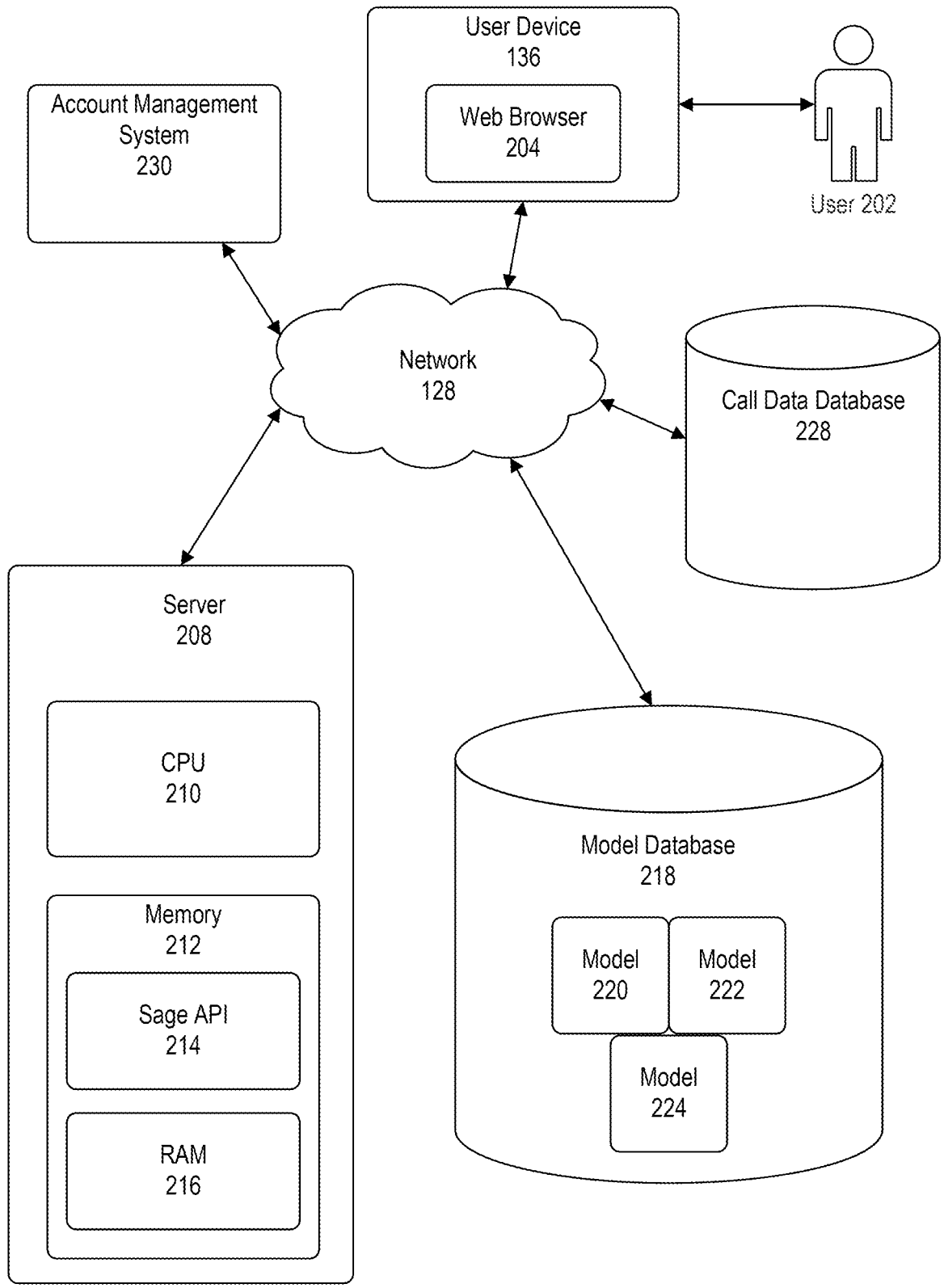
FIG. 2 is a diagram of an example architecture of system components consistent with one or more example embodiments.

Referring now to FIG. 2, there is shown a block diagram representing an example architecture 200 of system components consistent with one or more example embodiments. In some aspects, architecture 200 may comprise any component of the environment described in connection with FIG. 1 (e.g., system 100) in addition to those discussed below. In various embodiments, for instance, system 100 (e.g., a computer) or user device 136, operated by user 202, may be operably coupled, via network 128 in architecture 200, to one or more servers 208 (e.g., a second system 100), one or more model databases 218, one or more call data databases 228, and one or more account management systems 230. As described above, network 128 may be any type of network such as a local area network (LAN), a wide area network (WAN), or other type of network.

A web browser 204 may execute on system 100 and/or user device 136 (e.g., via an appropriate application 114 and/or program 118). Web browser 204 may include functionality for receiving data entered by user 202 (e.g., via an appropriate input device 132) as part of a self-serve tool consisting of a plurality of graphical user interfaces (GUIs), such as those displayed on display 130. In general, web browser 204 may be any type of interpreted or executable software code such as a kernel component, an application program (e.g., Firefox, Google Chrome, Internet Explorer, etc.), a script, a linked library, an object with methods, etc.

Server 208 may be any type of computer system or computing device, such as computer system 100 of FIG. 1, for conducting processes consistent with the disclosed embodiments. Server 208 may be a special-purpose computer, an instance of computer 100, a computing cluster, a virtual computing instance (a virtual machine, container, or the like), a database, or other device capable of operating exemplary Sage API 214, which may analyze call data and configure associated models (e.g. determine parameters of models to update based on electronic tags in call data). In general, server 208 may provide services for operating with a Sage API 214. Server 208 may have a central processing unit or CPU 210 for performing operations, such as processing received call data. Server 208 may also have memory 212, which may contain Sage API 214 and/or working RAM 216, as well as other portions of memory not shown. In some embodiments, another API may be used to perform any or all the functions of Sage API 214. In other embodiments, multiple APIs may perform these functions.

An application program interface (API) may be a set of subroutine definitions, communication protocols, and/or programming tools that build software. In particular, Sage API 214 may be an API that generates graphical user interfaces (GUIs) for electronically tagging call data (e.g., any of the GUIs described with respect to FIGS. 3, 4A, and 4B). In some embodiments, Sage API 214 may receive call data from call data database 228. Sage API 214 may also generate, update, and/or delete a model (e.g. a model 220, 222, or 224) associated with tagging and analyzing call data. Sage API 214 may include predetermined rules or may develop rules (e.g., through a machine learning process).

In some embodiments, Sage API 214 may update a model by changing a parameter associated with the model (e.g. a threshold number of utterances of a keyword needed for a call to be electronically tagged as being associated with an irate customer). Sage API 214 may also update a model by adding or deleting a parameter associated with the model. Sage API 214 may update a model based on call data received from call data database 228 (e.g., according to process 500). For example, Sage API 214 may receive multiple audio files of recorded calls, where each recorded call has an utterance of a combination of key words and an electronic tag indicating compliance with a particular regulation. Based on this data, Sage API 214 may generate or update a model that determines that recorded calls with an utterance of the combination of key words comply with the particular regulation (e.g., according to process 500). In some embodiments, Sage API 214 may request additional call data (e.g. in addition to call data stored at RAM 216, and the additional call data is stored at call data database 228).

Sage API 214 may take various actions using an existing model, including no action at all. In some embodiments, Sage API 214 may automatically electronically tag call data by applying a model to the call data (e.g., according to process 600). Automatically electronically tagging call data may include embedding an indicator in the call data (e.g., embedding a piece of data into the call data that indicates that an associated record call complies with a particular regulation). The embedded indicators may correspond to an attribute associated with the call data (discussed below). In other embodiments, Sage API 214 may determine possible derived actions from call data. For example, based on call data, Sage API 214 may determine that a customer has requested a particular account action (the purchase of a new product that will be associated with the customer's account, a payment made to the customer's account, a charge made to the customer's account, etc.). Derived actions may occur at a server 208 and/or an account management system 230 or a provider device (discussed in further detail below). Based on this determination, Sage API 214 may query account management system 230 to determine if the new product has been associated with the customer's account (e.g., by identifying a charge to the customer's account for the new product). In some embodiments, Sage API 214 may send a notification to a device (e.g., a user device 136 or another account management system 230) indicating whether a possible derived action has occurred (e.g., that a customer's account has been charged for a new product).

Model database 218 may include one or more models for managing call data, consistent with the disclosed embodiments. As depicted in FIG. 2, for instance, model database 218 may store models 220, 222, 224, etc. User 202 may use user device 136 to access one or more of the models 220, 222, 224 and may use interfaces and the like (e.g., in connection with system 100) to manually configure a models 220, 222, or 224. Server 208 may receive any or all of these models from call data database 218 and send any or all of them to another device (e.g., user device 136) based on user input (e.g. inputs to web browser 204 through, e.g., input device 132). In some embodiments, server 208 may send a model 220, 222, or 224 to another device based on Sage API 214 updating, or proposing an update to (e.g., by placing an indicator as discussed with respect to FIG. 6), model 220, 222, or 224. Server 208 may also send data to display particular information at user device 136 (e.g., sending a graphical user interface, possibly with graphical and/or textual indicators of suggested updates to a model).

Call data database 228 may contain call data (e.g., data associated with telephone conversations between customers and merchants. Call data database 228 may have an electronic storage medium (e.g. hard drive, ROM, RAM, flash memory, solid state drive, etc.), which may store call data. Call data may include a variety of information. For example, call data may include an audio file, a waveform, a transcript, call metadata, electronic tags, and other data associated with a call. In some embodiments, call data may include data gathered as part of a customer-chat bot interaction (e.g., a transcript from a chat between a person and an online chat bot), data associated with an email, or data associated with a text message. Call data may indicate a particular attribute associated with a call or a portion of a call (e.g., using an embedded indicator). These attributes may include, but are not limited to, an irate customer, a customer complaint, a description of a product associated with a merchant associated with the call, a description of a product not associated with a merchant associated with the call, compliance with a particular regulation, noncompliance with a particular regulation, an account action request (e.g. change to account information such as customer contact information), a payment, a customer question, and an operator mistake. Attributes may also include an attribute indicating the opposite of any of these (e.g., lack of a customer complaint).

Account management system 230 may be a server, system 100, or the like, and may contain customer account information. Account management system 230 may have an electronic storage medium (e.g. hard drive, ROM, RAM, flash memory, solid state drive, etc.), which may store call data. Customer account information may include, but is not limited to, a customer name, address, phone number, email address, credit or debit card number, date of enrollment with a merchant or a product, a product associated with the customer account, date of an account action (e.g., cancellation of a subscription), notification preferences, purchase history, customer-specific notes, and the like. Account management system 230 may be a associated with a particular entity, such as a financial service provider. Account management system 230 may include any number of provider devices associated with different aspects of account management. For example, a provider device may be associated with any or all of account payments, customer personal information, customer support requests, account services, account settings (e.g., notification settings), and the like.

Referring now to FIG. 3, there is shown an illustration of an example search graphical user interface, or search GUI 300, according to one or more example embodiments. Search GUI 300 may be displayed at user device 136 (e.g. in response to an input received at user device 136, such as the selection of a button displayed at a display 130 of a user device 136). Search GUI 300 may include several fillable areas for search parameters. These fillable areas may include, but are not limited to, an agent first name parameter area 302, an agent last name parameter area 304, an account ID parameter area 306, a call from data parameter area 308, a contact ID parameter area 310, an origin phone number area 312, an agent electronic identification (EID) parameter area 314, minimum duration parameter area 316, maximum duration parameter area 318, and call to date parameter area 320. In some embodiments, search GUI 300 may include a fillable area (not shown) where a user may enter a call attribute, such as the attributes described with respect to FIG. 2. Search GUI 300 may also include a search button 322, reset button 324, and search result table 326, which may have any number of search result parameter columns 328 and a call data result 330.

When search GUI 300 is displayed at user device 136, a user 202 may interact with these various parts of search GUI 300. For example, a user 202 may enter information into any of the fillable areas (e.g., using an input device 132, such as a mouse and/or keyboard) related to a set of call data the user may be searching for (e.g. a subset of call data contained at call data database 228). After entering information into any number of the fillable areas, a user 202 may select search button 322. After search button 322 has been selected, GUI 300 may display search result table 326.

The information displayed in search result table 326 may be based on the information entered into a fillable area by user device 136 (which may be operated by a user 202). For example, if a particular duration value was entered in maximum duration parameter area 318, search result table 326 may reflect call data results 330 for calls having a maximum duration of the duration value entered in maximum duration parameter area 318. In some embodiments, if a fillable area (not shown) for a call attribute has information entered related to a particular attribute (e.g., irate customer), search GUI 300 may search for call data with embedded indicators corresponding to the attribute, which may then be reflected in call data results 330 (e.g., search GUI 300 may display all call data in call data database 228 having embedded indicators of an irate customer attribute at search result table 326). Information displayed in any of the fillable fields or search result table 326 may be removed (i.e. cleared) when reset button 324 is selected.

Search GUI 300 may also receive an input to order the call data displayed in search result table 326. In some embodiments, a user 202 may select the top of a search result parameter column 328, which may cause a re-ordering of the call data results 330 in search result table 326 according to the column selected. For example, a user 202 may select (e.g. by clicking with a mouse at user device 136) the top of the column for "agent last name," and the call data results 330 may be re-ordered in alphabetical or reverse alphabetical order. In other embodiments, search GUI 300 may also have other buttons (not shown) which, when selected, may order the call data results 330 depending on the button selected (e.g., a button labeled "sort by agent last name," may perform the same function as the column selection aspect in the above-described example).

Search GUI 300 may rely on a search engine program (e.g. an application 114 and/or program 118) to produce call data results 330. While search GUI 300 is shown as an interactive graphical user interface in FIG. 3 (i.e. for interaction by a user 202), in some embodiments Sage API 214 may automatically use the search engine to identify pertinent call data results 330 for use in the configuring of models associated with call data, consistent with the disclosed embodiments.

Figure 4A:
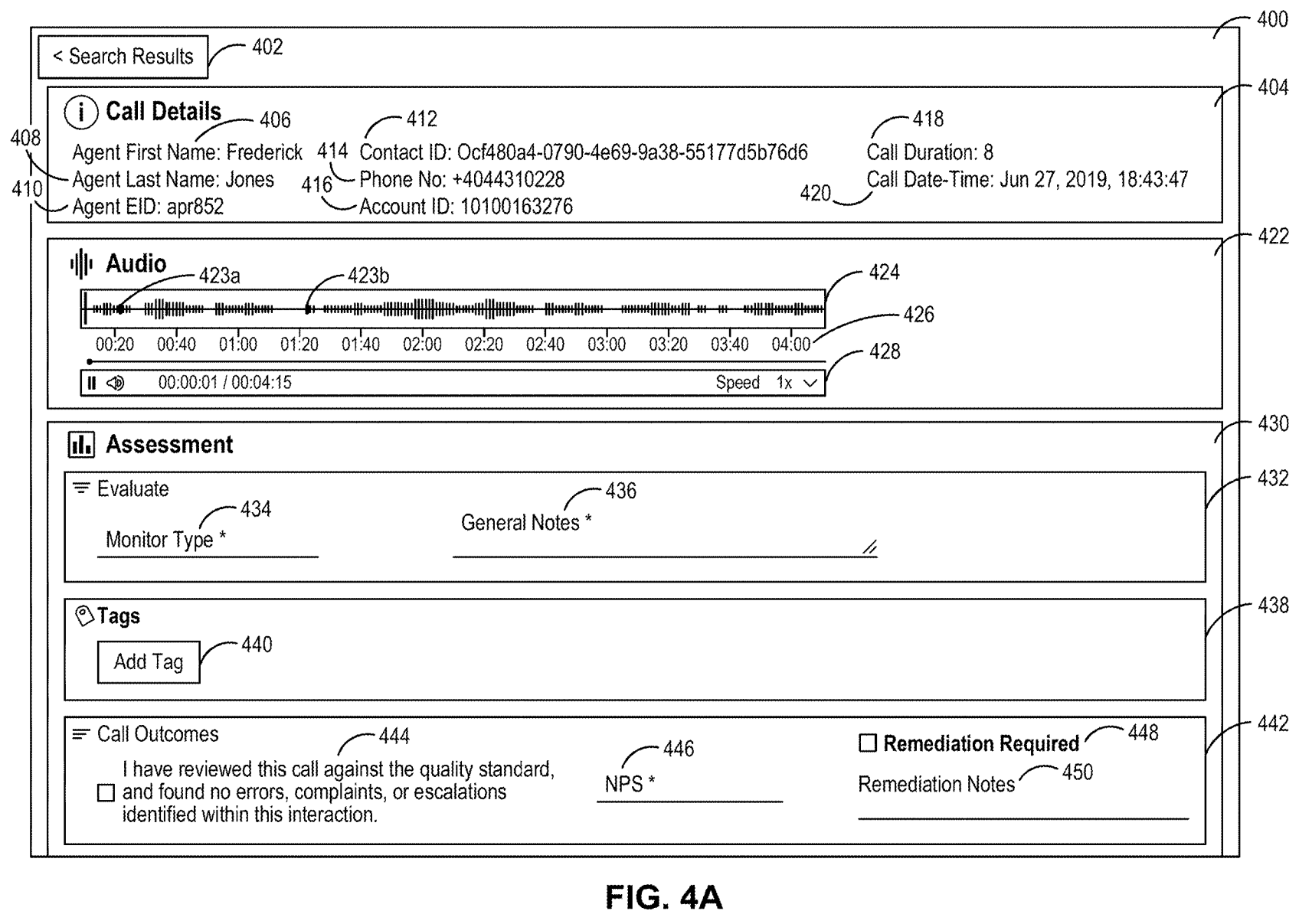

Referring now to FIG. 4A, there is shown an illustration of an example interactive call detail graphical user interface, or call detail GUI 400, according to one or more example embodiments. Call detail GUI 400 may be displayed at user device 136 (e.g. at display 130, in response to an input at user device 136). For example, call detail GUI 400 may display following a selection of an individual call data result 330 (e.g. call detail GUI 400 may display additional information about a call data result 330).

Call detail GUI 400 may include a search results button 402, which may display search GUI 300 upon selection (e.g. by clicking with a mouse). In some embodiments, call detail GUI 400 may include call detail area 404, which may have a number of descriptors, which may correspond to the fillable areas of search GUI 300. These descriptors may include any or all of, without limitation, agent first name descriptor 406, agent last name descriptor 408, agent EID descriptor 410, contact ID descriptor 412, phone number descriptor 414, account ID descriptor 416, call duration descriptor 418, and call date-time descriptor 420. In some embodiments, the number and types of descriptors displayed by call detail GUI 400 may be based on the fillable fields displayed and/or interacted with by user device 136 (e.g., by a user 202) at search GUI 300.

Call detail GUI 400 may also have call record area 422, which may allow a user device 136 to interact with a waveform, transcript, and/or audio file associated with a recorded call. Sage API 214 may perform any number of the changes described herein based on an input at call detail GUI 400, consistent with the disclosed embodiments. Call record area 422 may include call record 424, time markers 426, and audio toolbar 428. In some embodiments, call record area 422 may display a waveform associated with audio of a recorded call (e.g. an audio file of a recorded conversation between a merchant and a customer). In other embodiments, call record area 422 may display a transcript associated with a recorded call (i.e. a string of text corresponding to spoken words from the recorded call). In some embodiments, this transcript may be generated by a speech-to-text program (e.g., an application 114 and/or program 118).

In some embodiments, call record area 422 may allow a user to electronically tag and/or otherwise manipulate call record 424 and/or an audio file associated with call record 424. For example, a user 202 may select a point 423a (e.g. by clicking with a mouse, which may be an input device 134), which may place a visual mark at point 423a. In some embodiments, selecting point 423a on call record 424 may also cause Sage API 214 to embed data associated with point 423a in an audio file associated with call record 424, create a new file, or create new metadata associated with point 423a and call record 424. In some embodiments, a user 202 may select multiple points on call record 424, such as point 423a and point 423b. In some embodiments, selecting points 423a and 423b may cause the selection of a segment of call record 424. In other embodiments, selecting a single point on call record 424 (e.g. using a mouse click) and dragging to a second point may cause the selection of a segment of call record 424. When a segment or point of call record 424 has been selected, the segment or point may be highlighted (e.g. by Sage API 214) on a display 130 to allow a user 202 to visualize the selected segment or point. In some embodiments, selecting a point or segment on call record 424 may cause Sage API 214 to embed data associated with a segment of call record 424 (e.g., a segment between points 423a and 423b, where points 423a and 423b may be the endpoints of the segment) in an audio file associated with call record 424, create a new file, or create new metadata associated with the segment and call record 424. In some embodiments, Sage API 214 may embed this data after a point or segment on call record 424 is selected and another input is received (e.g. an input to add tag button 454), consistent with the disclosed embodiments.

Call detail GUI 400 may allow for manipulation of the call record 424 that is visible at call record area 422. For example, a user 202 may be able to use an input device 132 to zoom in or zoom out over a portion of call record 424 (e.g., by scrolling with a mouse while a mouse point hovers over the portion of the waveform or using keystroke combinations at a keyboard). In some embodiments, call detail GUI 400 may allow a user to scroll across portions of call record 424 using an input device 132 (e.g., by dragging call record 424 with a mouse or using keystroke combinations at a keyboard). The values and placement of time markers 426 may dynamically change in response to these actions and others.

Audio toolbar 428 may also allow for manipulation of call record 424. In some embodiments, audio toolbar 428 may include a pause/play button, which, if selected, may pause or play audio associated with call record 424 at, for example, output device 134. Audio toolbar 428 may also include a volume button, bar, or other interactive portion that may allow a user device 136 (which may be operated by user 202) to adjust the volume of playing audio associated with call record 424. In some embodiments, toolbar 428 may include a playback speed adjustor, which, when selected, may change an audio playback speed of playing audio associated with call record 424. While these actions may manipulate currently playing audio, it should be noted that they may also edit an audio file associated with call record 424 (e.g., selecting the playback speed adjustor may edit the playback speed of at least a portion of an audio file associated with call record 424). In some embodiments, toolbar 428 may include other buttons, sliders, fields, and the like for performing, at playing audio and/or an audio file, any or all of, without limitation, changing a frequency, removing a segment of audio, adding a segment of audio, and filtering a segment of audio.

Call detail GUI 400 may also include assessment area 430, which may have monitor type area 434 and/or note area 436. At monitor type area 434, a user 202 may be able to input information (e.g., using an input device 134, such as a mouse and/or keyboard) associated with a purpose for which the user 202 may be reviewing a call. For example, monitor type area 434 may allow user 202 to input a text string of "regulatory compliance." In some embodiments, monitor type area 434 may only permit a predetermined subset of inputs (for example, a user 202 may be able to input "regulatory compliance" but not "this is a test"). At note area 436, a user 202 may be able to input information, such as a string of text, which may describe a unique aspect of a call and/or user device 136, which may be associated with user 202, who may be a designated reviewer of the call.

Call detail GUI 400 may also include tag area 438, which may have an add tag button 440. In some embodiments, when add tag button 440 is selected (such as at user device 136), new tag GUI 452 may be displayed (e.g., at display 130). In other embodiments, when add tag button 440 is selected, call record 424 and/or an audio file may be edited.

Call detail GUI 400 may also include call outcome area 442, which may have any number of a checklist item 444, outcome descriptor area 446, remediation indicator area 448, and remediation note area 450. Checklist item 444 may include a description and a checkbox, which may be checked or un-checked with an input device 134 at, e.g., user device 136. At outcome descriptor area 446, a user device 136 may input information regarding a particular outcome of a call. Remediation indicator area 448 may have a description and a checkbox, which a user device 136 may check or un-check to indicate that remediation is needed for a call associated with call record 424. Remediation note area 450 may accept inputs (e.g., a string of text entered by a keyboard) from a user device 136 to describe remediation need for a call associated with call record 424. In some embodiments, inputs received at call detail GUI 400 may propagate other changes, such as embedding data associated with an input into an audio file associated with call record 424, creating a new file, creating new metadata associated with the input and/or call record 424, or querying account management system 230, consistent with the disclosed embodiments.

In some embodiments, any input from a user device 136 may not be accepted by call detail GUI 400 or new tag GUI 452 (an audio file may not be edited, metadata may not be created and/or changed, information may not be transmitted, etc.) unless a particular input has been received at user device 136 (e.g. a "save" button has been selected). For example, changes made to a waveform (e.g., tagging) within call call detail GUI 400 may not be reflected in underlying data until an input at a particular area (e.g., a save button) has been received at user device 136.

Figure 4B:
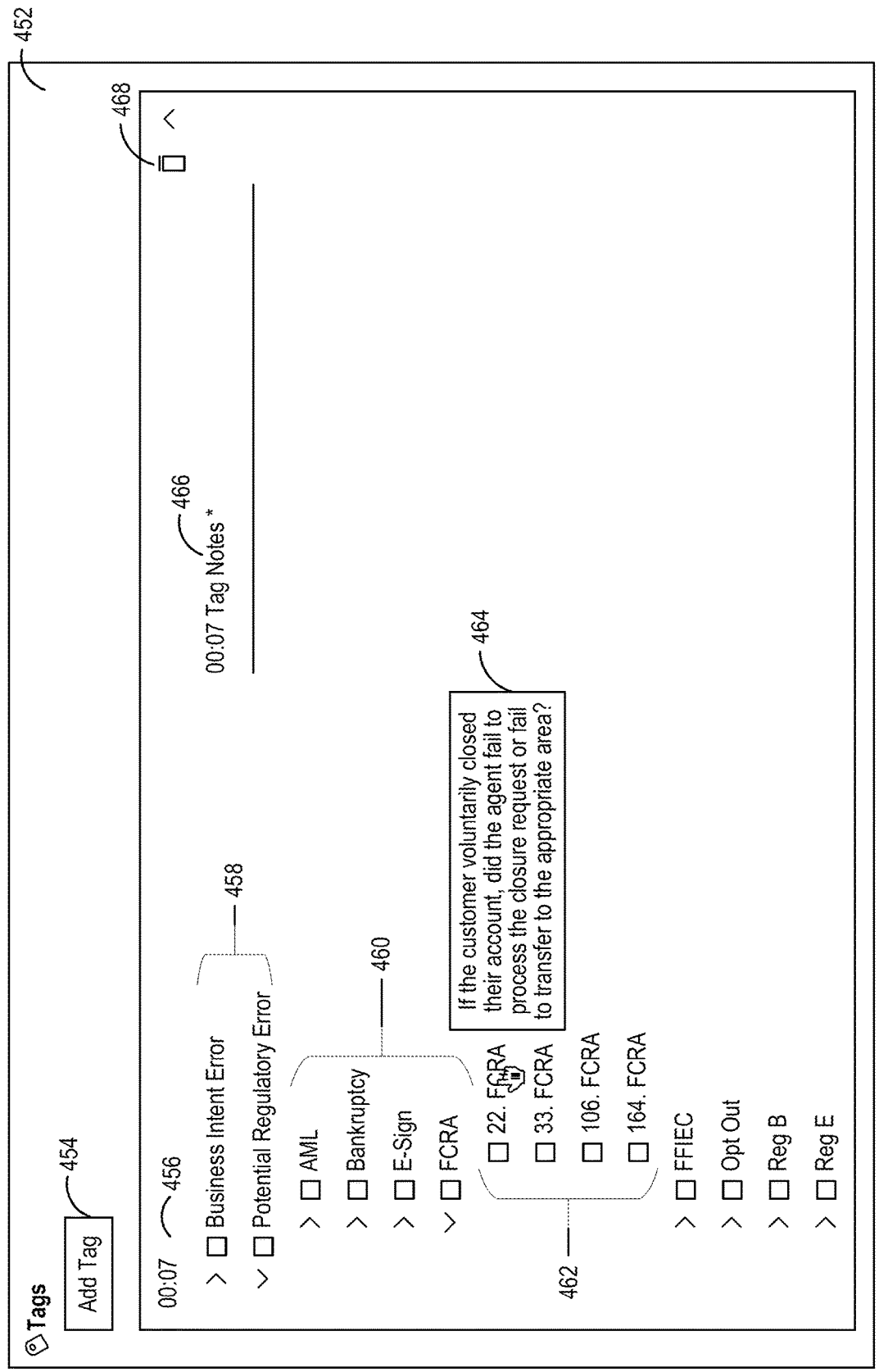
FIG. 4B is an illustration of a graphical user interface for tagging electronic call data consistent with one or more example embodiments.

Referring now to FIG. 4B, there is shown an illustration of an example interactive electronic call tagging graphical user interface, or new tag GUI 452, according to one or more example embodiments. New tag GUI 452 may be displayed at user device 136 (e.g. at display 130, in response to an input at user device 136). For example, as previously described, new tag GUI 452 may display when add tag button 440 is selected.

New tag GUI 452 may include add tag button 454, timestamp 456, first level markers 458, second level markers 460, and third level markers 462. In some embodiments, a user 202 may select add tag button 454 to add an electronic tag to call record 424, add an electronic tag to an audio file associated with call record 424, generate metadata associated with call record 424, or the like. For example, an electronic tag or metadata may contain data corresponding to any number of inputs received at call detail GUI 400 or new tag GUI 452, consistent with the disclosed embodiments. In some embodiments, an electronic tag or metadata may be associated with a segment of call record 424 corresponding to timestamp 456 (for example, if timestamp 456 reads "00:07," an electronic tag or metadata may be associated with the seventh second of call record 424).

First level markers 458, second level markers 460, and third level markers 462 may comprise drop-down menus having a list of descriptions and checkboxes. In other embodiments, the markers 458, 460, and 462 may have toggles, fields, icons, text boxes, and the like. In some embodiments, second level markers 460 may display (e.g. "drop down") based on an input received at a first level marker 458 (e.g., a mouse click at an icon). Similarly, third level markers 462 may display based on an input received at a second level marker 460. In some embodiments, second level markers 460 may be associated with a subset of information related to a first level marker 458. Similarly, third level markers 462 may be associated with a subset of information related to a second level marker 460. At any of the markers 458, 460, or 462, new tag GUI 452 may receive an input from user device 136. For example, new tag GUI 452 may receive an input based on a mouse click that a user 202 made at a markers 458, 460, or 462 (e.g., to indicate that a call record 424 complies with a particular regulation).

New tag GUI 452 may also include info panel 464, tag note area 466, and delete button 468. Info panel 464 may display text or otherwise inform a user 202 of information related to any of the markers 458, 460, or 462. In some embodiments, new tag GUI 452 may display an info panel 464 related to a particular marker 458, 460, or 462 when a user 202 selects that particular marker or hovers a mouse pointer over it. At tag note area 466, a user 202 may input customized data related to a call record 424. Any or all inputs received at markers 458, 460, or 462 or tag note area 466 may be related to an electronic tag and/or metadata to be generated, embedded, etc. with respect to a call record 424, consistent with the disclosed embodiments.

Delete button 468 may allow a user 202 to delete an electronic tag and/or metadata associated with a call record 424. Delete button 468 may be selected by an input device 134 (e.g. via a mouse click at user device 136), at which point a tag associated with call record 424 may be deleted (e.g., by user device 136). In some embodiments, deleting the tag may involve deleting data stored at model database 218 or call data database 228.

Figure 5:
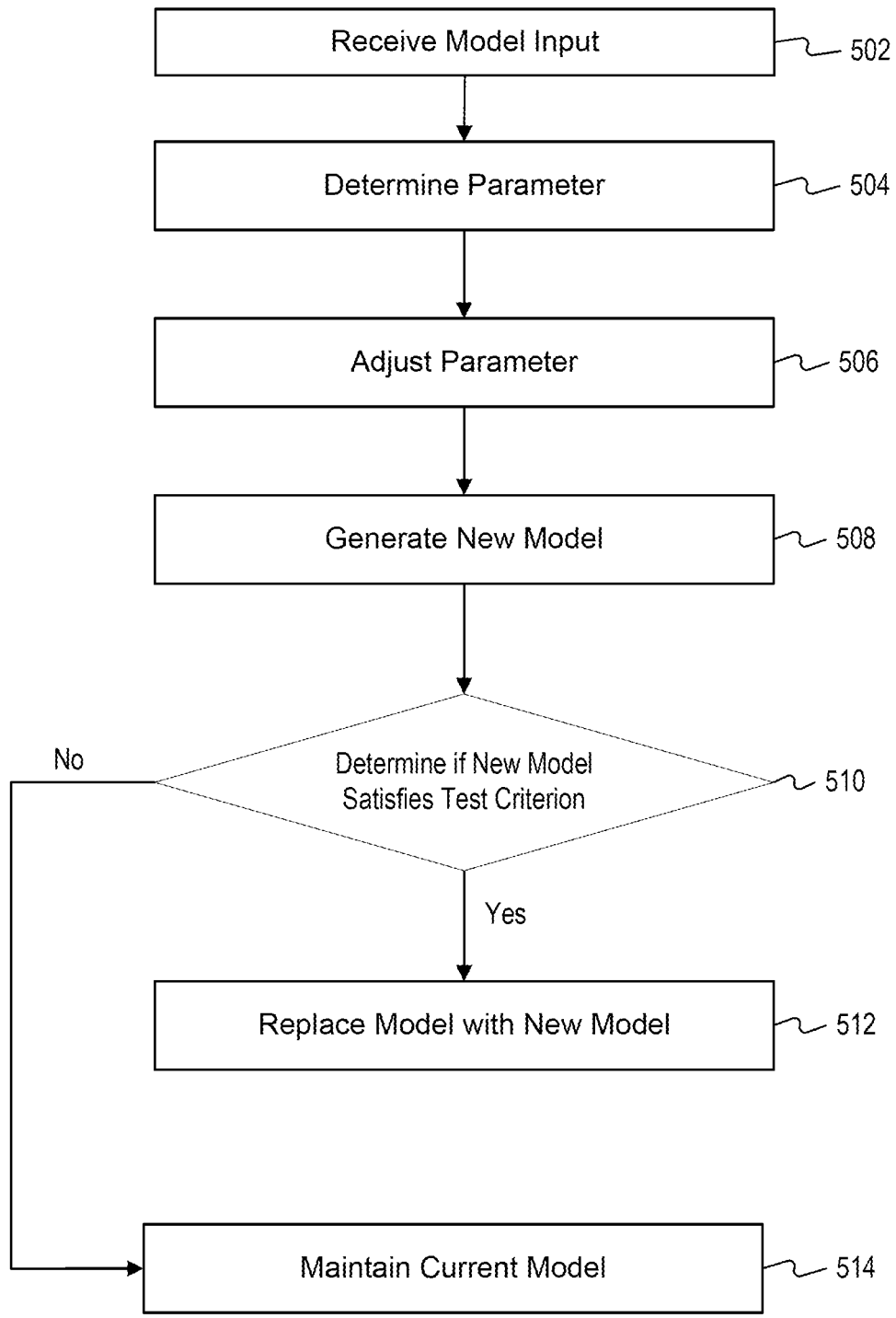
FIG. 5 depicts an exemplary process flowchart for call data model management consistent with one or more example embodiments.

Referring now to FIG. 5, there is shown a flow chart of an example model configuration process 500, consistent with one or more example embodiments. In some embodiments, exemplary model configuration process 500 may be executed by server 208 (e.g. implemented on at least one computing system such as system 100), to manage and configure models.

At step 502, model input may be received by a computing device, such as server 208. The model input may be based on any number of inputs received at GUIs such as call detail GUI 400 and new tag GUI 452, which may be inputs received at a user device 136 (e.g., through an input device 134). A model input may include any or all of an audio file, a call transcript, call metadata, or the like. A model input may or may not be electronically tagged. In some embodiments, a model input may include an indicator of a model for which the model input is to be used to update, generate, delete, etc.

At step 504, a determination of a relevant parameter (or parameters) may be made at the computing device. The parameter may be part of a model for call record analysis (i.e. a model configured to analyze call records). A parameter may be associated with a trait of a call record (e.g. a recorded call represented by an audio file). For example, a parameter may include certain keywords uttered, a frequency of keywords uttered, a proximity of keywords, volume, change in volume, frequency, change in frequency, periods of silence, etc. A trait may also be a pattern of, or lack of, any of the aforementioned traits. In some embodiments, the computing device may determine multiple parameters based on the received model input.

A model may be, without limitation, any one of a computer software module, an algorithm, a machine-learning model, a data model, a statistical model, a recurrent neural network (RNN) model, a long-short term memory (LSTM) model, or another neural network model, consistent with the disclosed embodiments. In some embodiments, a model may be configured to identify an attribute (an irate customer, regulatory compliance, etc.) in a call record (e.g. an audio file). In some embodiments, a model may be configured to automatically electronically tag call data (such as by using the process described with respect to FIG. 6). For example, a model may use a parameter associated with a keyword of a merchant's product being within a particular number of words of a keyword of a competitor's product. In this example, call records may be processed according to this model and electronically tagged with indicators of a potentially lost customer at the segment of the call record having the keywords (as discussed with respect to FIG. 6). In some embodiments, models may be stored at model database 218 (e.g., models 220, 222, and 224).

At step 506, a parameter may be adjusted by the computing device. In some embodiments, a parameter may be adjusted based on the received model input. For example, based on multiple recorded calls with electronic tags indicating the calls do not conform to a particular regulation (one of many possible model inputs), the computing device may determine that the lack of a keyword in the call may indicate nonconformance with the particular regulation and adjust a parameter associated with that keyword and/or regulation. In other embodiments, a parameter may be added to or removed from a model at step 506. In some embodiments, multiple parameters may be adjusted, added, or removed, regardless of how many parameters were determined at step 504. For example, even if one parameter is determined at step 504, that parameter may be interdependent with other parameters. In these exemplary situations, the computing device may determine that the interdependent parameters should also be adjusted, which may be done to ensure the accuracy of a model.

At step 508, a new model may be generated by the computing device. The new model may be based on the received model input and may include an adjusted parameter. In some embodiments, an existing model may be updated, rather than a new model generated. However, for purposes of this disclosure, an adjusted model may be considered a new model and vice versa.

At step 510, the computing device may determine if the new model satisfies a testing criterion. For example, if the new model is associated with a particular trait (as discussed above) or a monitor type (e.g., as indicated at a monitor type area 434) the computing device may process call data using the new model, where the call data used is known to be associated with the trait or monitor type (e.g., the calls are electronically tagged with indicators of nonconformance with the particular regulation). The testing criterion may include whether the new model can identify a threshold proportion of the call data (e.g. percentage of recorded calls) as being associated with the trait or monitor type. Continuing the example above, determining if the new model satisfies a testing criterion may include determining (e.g., by Sage API 214, an application, and/or a program) whether the new model identifies a threshold number of electronically tagged calls as being associated with nonconformance of the particular regulation. If the new model satisfies the testing criterion, exemplary model configuration process 500 may proceed to step 512. If the new model does not satisfy the testing criterion, exemplary model configuration process 500 may proceed to step 514. In some embodiments, the determination of whether the new model satisfies a testing criterion may be based on an input received at user device 136. For example, a depiction of the new model and/or results associated with it may be displayed at display 130 together with graphical buttons, which a user 202 may select (using, e.g., input device 132) to indicate that the new model does or does not satisfy a testing criterion.

At step 512, an already existing model may be replaced with the new model. In some embodiments, these models may be associated with the same particular trait (discussed above) or monitor type. In some embodiments, the already existing model and/or the new model may be stored at model database 218 (as e.g., model 220, 222, or 224). In some embodiments, the new model may be maintained as an operative or primary version of a model, and the already existing model it replaced may be maintained as an inoperative version of the model. In some embodiments, process 500 may send a notification to a user device 136 to indicate that an already existing model has been replaced by the new model.

At step 514, an already existing model may be kept and maintained by a device such as model database 218. In some embodiments, the new model generated at step 508 may be discarded, and any data associated with it may be deleted (e.g., from model database 208). In other embodiments, the new model generated at step 508 may be maintained as an inoperative version of a model. In instances where the new model is maintained and not discarded, it may be made available to be a model input at step 502. In some embodiments, process 500 may send a notification to a user device 136 to indicate that an already existing model is being maintained and/or a new model has been discarded.

Figure 6:
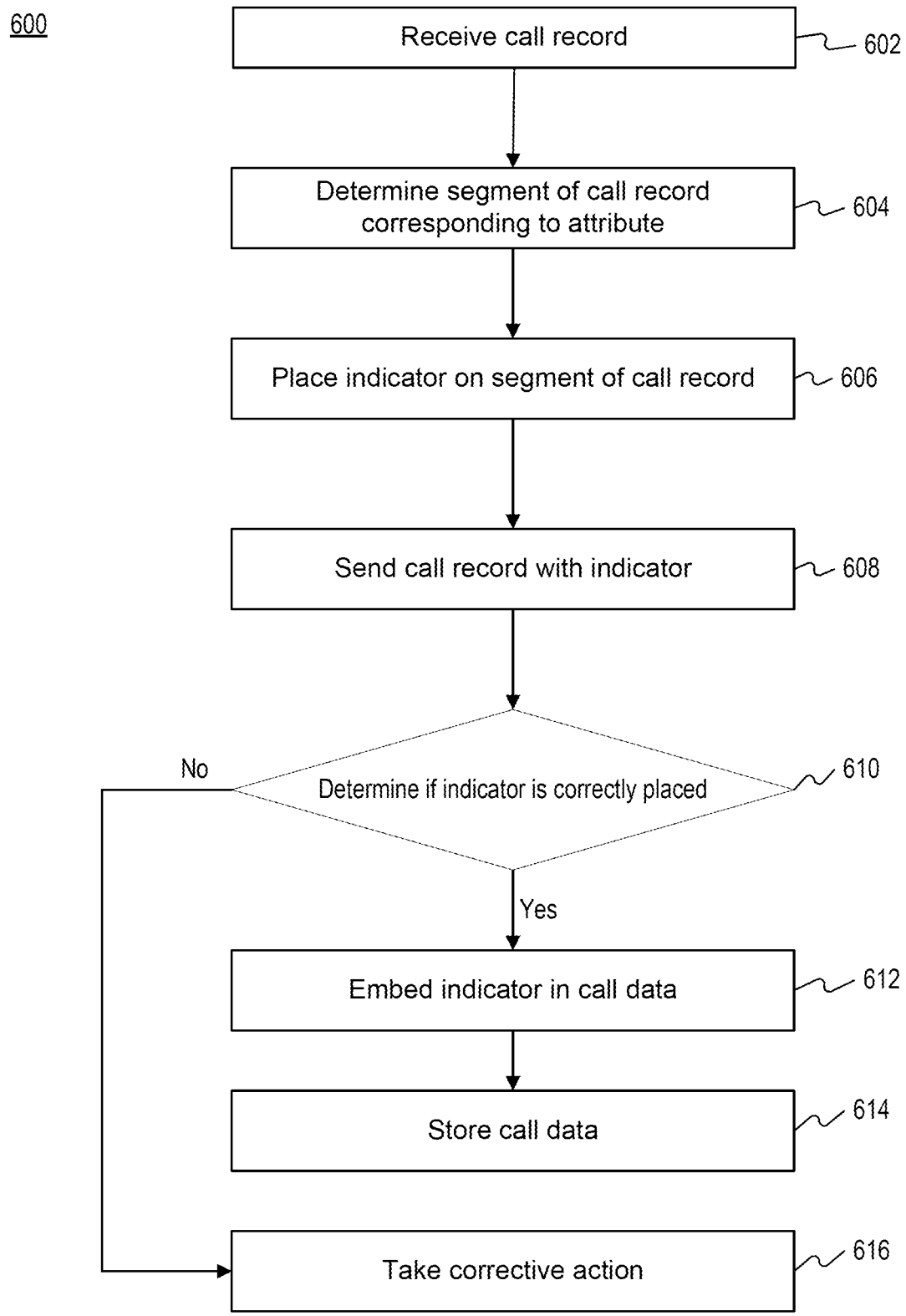
FIG. 6 depicts an example process flowchart for automatically tagging electronic call data consistent with one or more example embodiments.

Referring now to FIG. 6, there is shown a flow chart of an example electronic tagging process 500, consistent with one or more example embodiments. In some embodiments, exemplary electronic tagging process 600 may be executed by server 208 (e.g. implemented on at least one computing system such as system 100), to manage and electronically tag call data.

At step 602, a call record may be received by a computing device, which may be a server 208. A call record may be any or all of, without limitation, an audio file, a waveform, a transcript, or call metadata, any or all of which may be associated with a recorded call. In some embodiments, the call record is sent from call data database 228. The call record may be stored at RAM 216.

At step 604, a segment of the call record may be identified as corresponding to a particular attribute. Such identification may take place as a result of the call record being processed by a model, such as one of models stored at model database 218, which may be accessed by server 208 through network 128. As discussed above, the model may be configured to identify an attribute (an irate customer, regulatory compliance, etc.) in a call record. In some embodiments, such identification may be based on parameters of the model (discussed with respect to FIG. 5).

At step 606, an electronic indicator may be placed at a point or segment of the call record, which may identify an attribute at that point or segment. In some embodiments, Sage API 214 or a software program may place the indicators. In some embodiments, a model (e.g. a model sent from model database 218 and used by server 208) may be configured to place the indicators (e.g., automatically and/or based on the parameters of the model).

At step 608, the call record and indicator may be sent to another device, such as user device 136. When received, the call record and indicator may be displayed (e.g., at display 130) in a visual representation showing where a particular attribute is within a call record (e.g. a waveform with at least one visual indicator at a point or points on the waveform).

At step 610, a determination may be made, such as by user device 136 or server 208 (e.g. using artificial intelligence and/or a model), as to whether an indicator is correctly placed. In some embodiments, an indicator may be determined as correctly placed if a confirmation input is received at user device 136 (e.g. a user 202 selects a particular button on a graphical user interface). In some embodiments, a program (e.g., a program 118) may be used to check for errors in the placement of indicators, such as if an indicator of an irate customer is placed on a silent portion of a call record. If the indicator is determined to be correctly placed, process 600 may move to step 612. If the indicator is determined to not be correctly placed, process 600 may move to step 616.

At step 612, the indicator may be embedded into call data, which may include the call record. After the embedding of the indicator into the call data, the call data may be ready for use as a model input (e.g., to train a model). At step 612, similar call data to the call data with the correctly placed indicator may be determined (e.g. by server 208 querying call data database 228). In some embodiments, call data may be determined similar to other call data if the two sets share similar waveforms or waveform segments, share similar call metadata, share similar keywords, and/or share any of the traits mentioned with respect to FIG. 5. For example, server 208 may determine that the absolute difference between waveforms of two sets of call data may fall below a predetermined threshold, and determine that the two sets of call data are similar. In some embodiments, the similar call data may be processed according to steps of process 600 (e.g., to efficiently electronically tag similar call data).

At step 614, the call data may be stored, such at call data database 228 and/or model database 218 (which may both be part of a single database). In some embodiments, call data with correctly embedded indicators may be sent to model database 218 for storage (e.g., for use in training models). In other embodiments, call data without correctly placed indicators (and therefore possibly without embedded indicators) may only be sent to call data database 228 for storage and not to model database 218.

At step 616, process 600 may take a corrective action. The corrective action may include, but is not limited to, sending the call data to call data database 228 (e.g., for other processing prior to embedding indicators), sending a notification to user device 136 (e.g., a notification indicating that indicator is incorrectly placed), placing the same indicator at a different segment of the call record, and/or placing a different indicator at the same segment of the call record. In some embodiments, the corrective action may be based on the attribute determined at step 604, the segment determined at step 604, and/or a device that performed a step of process 600 (e.g., different corrective actions may be taken depending on whether the device is a user device 136 or a sever 202).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while example embodiments have been described herein, the scope includes any and all embodiments having equivalent elements, modifications, omissions, combinations (e.g., of aspects across various embodiments), adaptations or alterations. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as examples only, with a true scope and spirit being indicated by the following claims and their full scope of equivalents.

What is claimed is:

1. A system for performing call analysis comprising:
one or more memory units storing instructions; and
one or more processors that execute the instructions to perform operations comprising:
receiving, via a network, an electronically tagged model input representing a call record;
accessing a computerized neural network model comprising utterance-related model parameters, the computerized neural network model comprising (i) a recurrent neural network and (ii) being configured to intake the electronically tagged model input and analyze the electronically tagged model input; and
embedding, via the computerized neural network model, based on the utterance-related model parameters, an electronic indicator at a segment of the electronically tagged model input,
wherein embedding the electronic indicator comprises determining placement of the electronic indicator at the segment based on the utterance-related model parameters, the computerized neural network model applying one or more thresholds associated with the utterance-related model parameters to one or more portions of the electronically tagged model input.

2. The system of claim 1, wherein the computerized neural network model comprises a long short-term memory network configured to analyze the electronically tagged model input.

3. The system of claim 1, the operations further comprising determining that the electronic indicator is correctly placed based on a determination that a confirmation input is received at a user device.

4. The system of claim 1, the operations further comprising determining similar call data to the received model input based on a determination that the electronic indicator is correctly placed.

5. The system of claim 4, wherein determining the similar call data comprises determining that the similar call data and the received model input share at least of one similar waveforms or waveform segments, similar call metadata, or similar keywords.

6. The system of claim 1, wherein the operations further comprise taking a corrective action if the electronic indicator is not correctly placed, wherein the corrective action comprises at least one of sending a notification to a user device, placing the same electronic indicator at a different segment of the electronically tagged model input, or placing a different electronic indicator at the same segment of the electronically tagged model input.

7. The system of claim 1, wherein the operations further comprise automatically placing the electronic indicator by embedding the electronic indicator in the electronically tagged model input using an application programming interface.

8. The system of claim 1, wherein the operations further comprise:
receiving the electronically tagged model input at an interactive graphical user interface; and
receiving, by a user interaction with the interactive graphical user interface, an addition of an electronic tag to the received model input, wherein the electronic tag corresponds to a timestamp.

9. A method for performing call analysis comprising:
receiving, via a network, an electronically tagged model input representing a call record;
accessing a computerized neural network model comprising one or more utterance-related model parameters, the computerized neural network model comprising (i) a recurrent neural network and (ii) being configured to intake the electronically tagged model input and analyze the electronically tagged model input; and
embedding, via the computerized neural network model, based on the one or more utterance-related model parameters, an electronic indicator at a segment of the electronically tagged model input,
wherein embedding the electronic indicator comprises determining placement of the electronic indicator at the segment based on the one or more utterance-related model parameters, the computerized neural network model applying one or more thresholds associated with the one or more utterance-related model parameters to one or more portions of the electronically tagged model input.

10. The method of claim 9, wherein the computerized neural network model comprises a long short-term memory network configured to analyze the electronically tagged model input.

11. The method of claim 9, further comprising:
determining that a confirmation input is received at a user device; and
determining that the electronic indicator is correctly placed based on the determination that the confirmation input is received at the user device.

12. The method of claim 9, further comprising:
determining that the electronic indicator is correctly placed; and
determining similar call data to the received model input based on the determination that the electronic indicator is correctly placed.

13. The method of claim 12, wherein determining the similar call data comprises determining that the similar call data and the received model input share at least of one similar waveforms or waveform segments, similar call metadata, or similar keywords.

14. The method of claim 9, further comprising:
receiving the electronically tagged model input at an interactive graphical user interface; and
receiving, by a user interaction with the interactive graphical user interface, an addition of an electronic tag to the received model input, wherein the electronic tag corresponds to a timestamp.

15. One or more non-transitory computer-readable media storing instructions that, when executed by one or more processors, cause operations comprising:
receiving, via a network, an electronically tagged model input representing a call record;
accessing a computerized neural network model comprising one or more utterance-related model parameters, the computerized neural network model comprising (i) a recurrent neural network and (ii) being configured to intake the electronically tagged model input and analyze the electronically tagged model input; and
embedding, via the computerized neural network model, based on the one or more utterance-related model parameters, an electronic indicator at a segment of the electronically tagged model input,
wherein embedding the electronic indicator comprises determining placement of the electronic indicator at the segment based on the one or more utterance-related model parameters, the computerized neural network model applying one or more thresholds associated with the one or more utterance-related model parameters to one or mor portions of the electronically tagged model input.

16. The one or more non-transitory computer-readable media of claim 15, the operations further comprising:
determining that the electronic indicator is correctly placed based on a determination that a confirmation input is received at a user device.

17. The one or more non-transitory computer-readable media of claim 15, the operations further comprising:
determining similar call data to the electronically tagged model input based on a determination that the electronic indicator is correctly placed.

18. The one or more non-transitory computer-readable media of claim 17, wherein determining the similar call data comprises determining that the similar call data and the electronically tagged model input share at least of one similar waveforms or waveform segments, similar call metadata, or similar keywords.

19. The one or more non-transitory computer-readable media of claim 15, the operations further comprising taking a corrective action based on a determination that the electronic indicator is not correctly placed, wherein the corrective action comprises at least one of sending a notification to a user device, placing the same electronic indicator at a different segment of the electronically tagged model input, or placing a different electronic indicator at the same segment of the electronically tagged model input.

20. The one or more non-transitory computer-readable media of claim 15, the operations further comprising:
receiving the electronically tagged model input at a graphical user interface; and
receiving, by a user interaction with the graphical user interface, an addition of an electronic tag to the electronically tagged model input, wherein the electronic tag corresponds to a timestamp.

* * * * *